Oct. 19, 1937.    W. T. CONRAD    2,096,676
TIRE VALVE CORE EXTRACTOR
Filed Oct. 17, 1934
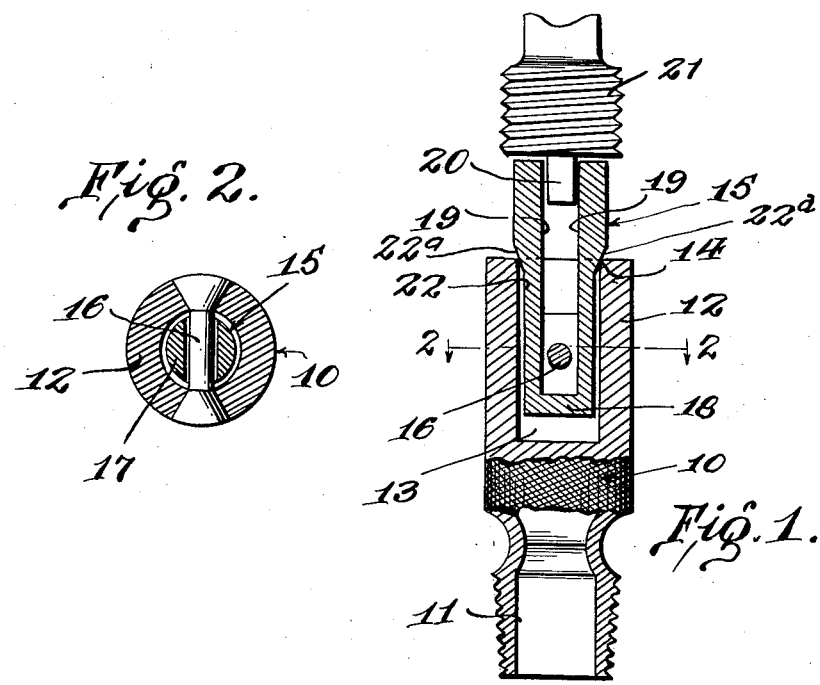
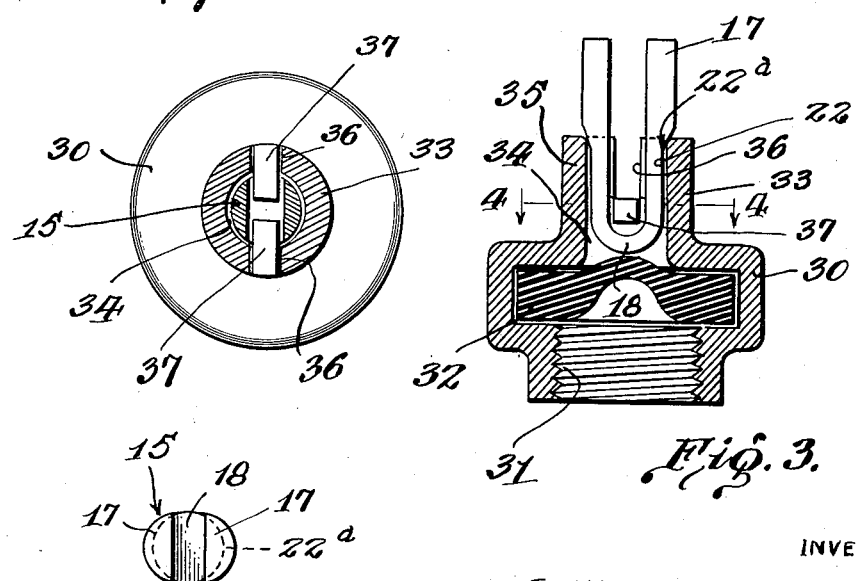
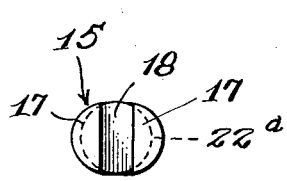
INVENTOR
William T. Conrad,
BY
Christian K. Nielsen.
ATTORNEY Patented Oct. 19, 1937

2,096,676

UNITED STATES PATENT OFFICE 2,096,676

TIRE VALVE CORE EXTRACTOR

William T. Conrad, Lawndale, Calif., assignor of forty-nine per cent to Daniel W. Walters, West Los Angeles, Calif.

Application October 17, 1934, Serial No. 748,749

1 Claim. (Cl. 81—3)

This invention relates to means for removing and replacing pneumatic tire valve cores and the like, and it consists in the constructions, arrangements and combinations herein described, and claimed.

It is an object of the invention to provide a valve core tool which may be incorporated as an integral part of a tap or dust cap, or similar instrumentality which will function as a handle for the expanding jaws of the tool.

It is a further object of the invention to provide a chuck wherein the jaws thereof are readily caused to grip and hold a valve core upon slight axial movement of the handle member associated with the chuck and by reverse axial movement of the handle cause release of the core, thereby permitting quick removal or replacement of the valve core within a valve stem.

Additional objects, advantages and features of invention will be apparent from the following description considered in conjunction with the accompanying drawing, wherein Figure 1 is a vertical sectional view of a tap embodying my chuck;

Figure 2 is a cross section on the line 2—2 of Figure 1.

Figure 3 is a vertical sectional view of a dust cap embodying my invention.

Figure 4 is a cross section on the line 4—4 of Figure 3.

Figure 5 is an end elevation of the chuck jaws.

Reference is first made to Figures 1 and 2 of the drawing wherein there is illustrated generally, a tire valve tap 10 which may be of conventional construction, including a threaded tap portion 11 and integrally connected body 12.

The body 12 has a bore 13, extending longitudinally thereof, stopping short intermediate the length of the body 12. The bore is preferably of circular formation, as viewed in cross section, the outer open end of which is slightly rounded, as at 14, forming a camming surface for actuating the chuck jaws, as will be described hereinafter.

A chuck 15 is seated within the bore 13, longitudinally slidable therein, but retained against withdrawal by virtue of a pin 16. The chuck 15 comprises a pair of jaws 17 joined together by a bight portion 18, presenting a substantially U-shaped formation and as clearly illustrated in Figure 1, the pin 16 is disposed transversely across the bottom and between the jaws 17, so that outward movement of the jaws is limited by virtue of engagement between the pin 16 and the bight portion 18.

The inner faces 19 of the jaws are spaced in parallel relation a distance sufficient to loosely receive the squared end 20 of the valve core 21, and the intermediate portions of the outer faces 22 of the jaws are formed with cam faces 22a which coact with the camming surface 14, as will now be explained.

With the construction described, it will be apparent that with the squared end 20 of the core interposed between the jaws 17, axial movement of the tap toward the core will cause the jaws 17 to be flexed inwardly toward the squared end portion 20, thereby firmly gripping the core for removal or replacement. This gripping is effected by the camming action produced by engagement between the cam surface 14 of the bore and the cam 22 of the jaws.

The cam faces 22 are quite short in length and obviously a short axial movement of the body 12 will house the cam faces within the bore 13. Therefore the jaws 17 will firmly grip and hold the core so that it may be readily rotated as will be required when removing or replacing the core within a valve stem. An axial movement of the handle 12 in a direction away from the core 21 will release the jaws 17 permitting them to return to their normal positions with consequent release of the core.

In Figures 3 and 4, I have illustrated the gripping jaw as applied to a dust cap of a tire valve, and since the construction of the gripping jaws is similar to that first described, the same reference characters are employed to designate like elements.

The dust cap 30 includes the usual threaded opening 31 for receiving a valve stem and immediately thereabove a rubber gasket or cap 32 is housed. The outer end of the cap 30 terminates in a chuck body 33 for receiving the chuck jaws 17. The chuck body 33 has a bore 34, the inner open end of which is rounded as at 35, and coacts with the cam faces 22a, as in the first described form.

At diametrically opposite sides of the chuck body 33, the wall thereof is cut longitudinally at suitable spaced points, as at 36, and the material therebetween is bent inwardly toward each other, forming lugs 37, the lugs being positioned between the jaws 17, thereby retaining the jaw within the bore 33.

The actuation of the jaws 17 in this instance is the same as in the preceding construction and therefore need no further description. However, it should be noted the rubber gasket will permit the proper inward movement of the jaws, due to the inherent resilience of the gasket.

While I have shown and described preferred constructions of my valve extractor, I am well aware that modifications may be made, and I therefore consider as my own all such variations in construction as fairly fall within the scope of the appended claim.

I claim:—

A valve core extractor comprising a body member having a longitudinal bore formed therein, said bore having a tapered face adjacent an outer end thereof, a chuck member loosely engaged and slidable within the bore, said chuck member comprising a pair of jaws arranged in opposed relation and connected by a bight portion, a pin carried by the body member and extending transversely of the bore and between said jaws whereby to limit outward movement of the chuck, and said gripping jaws having straight parallel outer side portions and tapered faces intermediate the length of the jaws, said tapered faces being complemental to the tapered face of the bore but normally extending outwardly slightly beyond the circumference of the bore whereby movement of the body member toward said jaws will cause flexing of the jaws to permit said chuck member to move longitudinally inward of the bore to a point upon the parallel side portions of the jaws and beyond the outer edges of the tapered faces to hold the jaws in gripping action upon an interposed valve core.

WILLIAM T. CONRAD.